United States Patent [19]

Sugeno

[11] Patent Number: 5,427,874
[45] Date of Patent: Jun. 27, 1995

[54] NON-AQUEOUS LIQUID ELECTROLYTE SECONDARY CELL

[75] Inventor: Naoyuki Sugeno, Fukushima, Japan

[73] Assignee: Sony Corporation, Tokyo, Japan

[21] Appl. No.: 242,419

[22] Filed: May 13, 1994

[30] Foreign Application Priority Data

May 26, 1993 [JP] Japan ............... 5-123709

[51] Int. Cl.$^6$ ........................... H01N 10/40
[52] U.S. Cl. ........................... 429/194; 429/197
[58] Field of Search ........................... 429/194, 197

[56] References Cited

U.S. PATENT DOCUMENTS

| 4,565,648 | 1/1986 | Kopp et al. | 252/397 |
| 5,219,683 | 6/1993 | Webber | 429/197 |
| 5,296,319 | 3/1994 | Bito et al. | 429/194 |

FOREIGN PATENT DOCUMENTS 0482287  4/1991  European Pat. Off.

OTHER PUBLICATIONS

Journal of the Electrochemical Society, vol. 127, No. 9, 1 Sep., 1980.

Patent Abstracts of Japan, vol. 8, No. 162 (C-235) 26 Jul. 1984.

Primary Examiner—Stephen Kalafut
Assistant Examiner—Carol Chaney
Attorney, Agent, or Firm—Hill, Steadman & Simpson

[57] ABSTRACT

A non-aqueous liquid electrolyte secondary cell having a negative electrode formed of a carbon material capable of being doped with and releasing lithium, a positive electrode, and a non-aqueous liquid electrolyte having an electrolyte dissolved in a non-aqueous solvent, is disclosed. This cell contains pyrocarbonate having the formula $(ROCO)_2O$, wherein R is an alkyl group selected from the group consisting of $CH_3$, $C_2H_5$ and $C_3H_7$. If the pyrocarbonate is mixed with other non-aqueous solvent(s), the proportion of the pyrocarbonate in the non-aqueous solvent, is not less than 25 vol%. The non-aqueous liquid electrolyte secondary cell is capable of withstanding charging/discharging cycles at high charging voltages, while exhibiting satisfactory charging/discharging cyclic performance under high temperature environment and superior discharging performance under low-temperature environment and heavy loads.

3 Claims, 4 Drawing Sheets

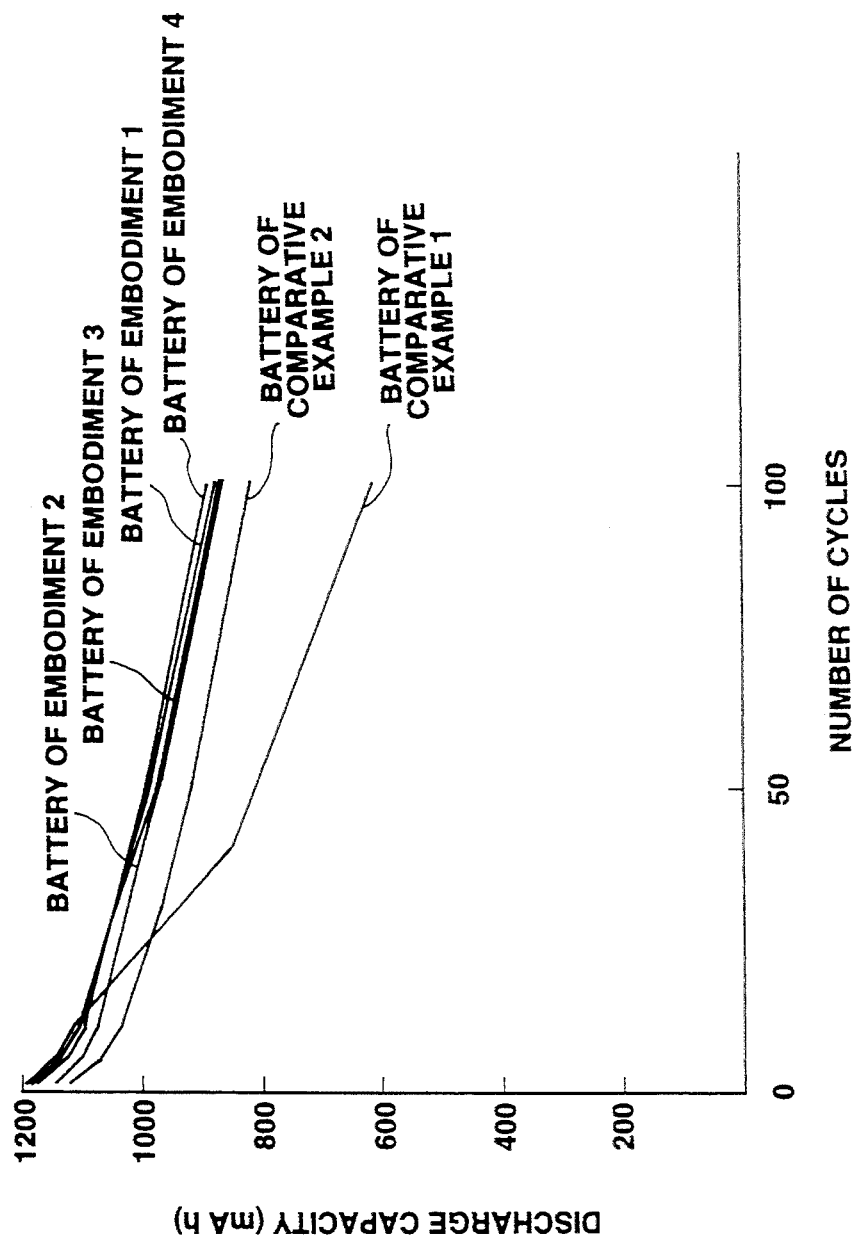

NON-AQUEOUS LIQUID ELECTROLYTE SECONDARY CELL

BACKGROUND OF THE INVENTION

This invention relates to a non-aqueous liquid electrolyte secondary cell employing a carbon material as an active material of the negative electrode thereof.

The non-aqueous liquid electrolyte secondary cell, employing a negative electrode of metal lithium and a liquid electrolyte, that is an electrolyte dissolved in a non-aqueous solvent, is low in self-discharge and superior in the operating voltage and storage properties, so that it may be used as a cell for prolonged time with high reliability. For these reasons, cells of this type are extensively employed for timepieces or as a memory backup power source.

The non-aqueous liquid electrolyte cell, so far used as the power source for these devices, is unexceptionally designed as the primary cell. Recently, the development of portable equipment in the field of the electronic equipment, such as video cameras, small-sized audio equipment or micro-computers, is proceeding, and an increasing demand exists for a secondary cell which is lightweight and of a larger capacity and which may be employed economically for a prolonged time as the power source for these portable devices. As the secondary cell capable of meeting the demand, the non-aqueous liquid electrolyte cell is thought to be promising, and research and development is now proceeding towards re-designing the non-aqueous liquid electrolyte cell as the secondary cell.

For example, such non-aqueous liquid electrolyte secondary cells, in which lithium, a lithium alloy or a lithium-occlusive material is used for the negative electrode and $MnO_2$, $TiS_2$, $MoO_3$, $MoS_2$, $V_2O_5$, $WO_3$ or $LiCoO_2$ is used for the positive electrode, have been proposed.

Of these, the non-aqueous liquid electrolyte secondary cell, in which a carbon material capable of being doped with and releasing lithium is used for the negative electrode, and a lithium transition metal composite oxides, represented by the formula $LiM_xN_{1-x}O_2$, where M, N represent one of Co, Ni, Mn, Cr, Fe or V, above all, lithium cobalt composite oxides, lithium nickel composite oxides or lithium manganese composite oxides, as the positive electrode, are thought to be highly promising because these secondary cells are high in the operating voltage and the energy density and superior in cyclic performance as compared to the non-aqueous liquid electrolyte secondary cell employing metal lithium or lithium alloys for the negative electrode. For example, non-aqueous liquid electrolyte secondary cells employing lithium cobalt composite oxides, lithium nickel composite oxides or lithium manganese composite oxides for the positive electrode, are ideal as secondary cells because their charging/discharging efficiency, represented by the ratio of the charging capacity to the discharging capacity, approaches 100%.

Meanwhile, the non-aqueous liquid electrolyte, comprising an electrolyte dissolved in a non-aqueous solvent, is usually employed as a liquid electrolyte for the non-aqueous liquid electrolyte cell.

If the cell is designed as a primary cell, propylene carbonate, ethylene carbonate, butylene carbonate, dimethoxyethane, tetrahydrofuran or methy tetrahydrofuran is used as the non-aqueous solvents, while $LiAsF_6$, $LiPF_6$, $LiBF_4$, $LiCF_3SO_3$, $LiCF_3CO_2$ or $LiClO_4$ is used as the electrolyte.

On the other hand, if the non-aqueous liquid electrolyte cell is designed as the secondary cell used for a portable electronic equipment, such as a video camera, it, is assumed that the charging/discharging is performed at, the charging voltage exceeding 4 V, so that, the non-aqueous liquid electrolyte is required to withstand such higher charging voltage.

However, if the liquid electrolyte employed for the non-aqueous liquid electroylse cell designed as the primary cell is directly used for the non-aqueous liquid secondary electrolyte cell and the charging/discharging cycles are carried out, at the charging volt, age of 4 V, the liquid electrolyte tends to be decomposed, while the active material of the positive electrode tends to be labile and dissolved in the liquid electrolyte, especially in the charged state of the cell, with the consequence that the cell cannot be employed for prolonged time.

For example, if a liquid electrolyte comprising $LiClO_4$ dissolved in a solvent mixture composed of equal amounts of propylene carbonate and dimethoxyethane at a concentration of 1 mol/liter is employed for the non-aqueous liquid electrolyte secondary cell, and the charging/discharging cycles are repeated under high temperature conditions of not lower than 45° C., the cell capacity is degraded quickly until the cell ultimately becomes unusable.

Consequently, attempts have been made in the non-aqueous liquid electrolyte secondary cell to add a variety of additional solvents to the above-enumerated liquid electrolyte for improving the stability of the cell operation. However, the use of the additional solvents may not be said to be proper in assuring the operational stability because the use of the additional solvents affects the cell performance seriously.

SUMMARY OF THE INVENTION

It is an object of the present invention to provide a non-aqueous liquid electrolyte cell in which decomposition of the liquid electrolyte or the tendency for the active material of the positive electrode to become labile or to be dissolved in the liquid electrolyte is not induced even on repeated charging/discharging cycles at the charging voltage exceeding 4 V and hence optimum cyclic performance may be maintained for prolonged time.

For accomplishing the above object, the present inventors have conducted exhaustive researches into the stability of the non-aqueous solvent, and arrived at the finding of pyrocarbonate as the stable non-aqueous solvent capable of withstanding the charging voltage of 4 V.

The present invention has been fulfilled based upon such information, and provides a non-aqueous liquid electrolyte secondary cell comprising a negative electrode formed of a carbon material capable of being doped with and releasing lithium, a positive electrode, and a non-aqueous liquid electrolyte having an electrolyte dissolved in a non-aqueous solvent, wherein pyrocarbonate having the formula $(ROCO)_2O$, where R is an alkyl group selected from the group consisting of $CH_3$, $C_2H_5$ and $C_3H_7$, is contained in the non-aqueous solvent for the non-aqueous liquid electrolyte.

If the pyrocarbonate having the alkyl groups having 1 to 3 carbons is used as the non-aqueous solvent for the non-aqueous liquid electrolyte in the non-aqueous liquid electrolyte secondary cell having the carbon material as the active material of the negative electrode, the cell becomes capable of withstanding the charging/discharging cycles at the high charging voltage, while becoming superior in charging/discharging cyclic properties under high-temperature environment, discharging properties under low-temperature environment or under heavy loads. Although the precise mechanism is not known, the following presupposition may be made.

The pyrocarbonate has the following molecular structure:

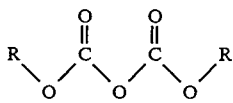

Thus the pyrocarbonate has a structure in which a pair of alkyl groups are bonded to each other via a carbonate ester linkage which is higher in stability than the ester linkage. The result is that the pyrocarbonate exhibits high voltage stability and is not likely to undergo a decomposition reaction even under high-voltage charged state and hence it does not deteriorate the cyclic performance of the cell.

In addition, the pyrocarbonate has an extremely high boiling point. Consequently, the cell is free from troubles such as rise in the inner cell pressure even after the charging/discharging cycles are repeated under high temperature environment, so that the optimum cell performance may be maintained.

Furthermore, since the pyrocarbonate is a chain compound, freedom of the molecular motion may be maintained even under low-temperature conditions so that the non-aqueous liquid electrolyte solution formed by dissolving an electrolyte into the pyrocarbonate solution may have high conductivity even under low-temperature environment.

The above presumably accounts for the improved cell performance achieved by the use of the pyrocarbonate-containing non-aqueous solvent.

It is seen from the foregoing that the non-aqueous liquid electrolyte secondary cell of the present invention, employing the non-aqueous solvent for the liquid electrolyte which contains the pyrocarbonate having alkyl groups having 1 to 3 carbons in the side chain thereof, is capable of withstanding charging/discharging cycles at high charging voltages, while exhibiting satisfactory charging/discharging cyclic performance under high temperature environment and superior discharging performance under low-temperature environment and heavy loads.

Thus the present invention provides the non-aqueous liquid electrolyte secondary cell which may be conveniently employed as a power source for portable equipment such as a video camera, small-sized audio equipment or micro-computers.

BRIEF DESCRIPTION OF THE DRAWINGS

FIG. 4 is a graph showing charging/discharging cyclic characteristics of the non-aqueous liquid electrolyte secondary cell under a high-temperature environment.

DETAILED DESCRIPTION

Figure 1:
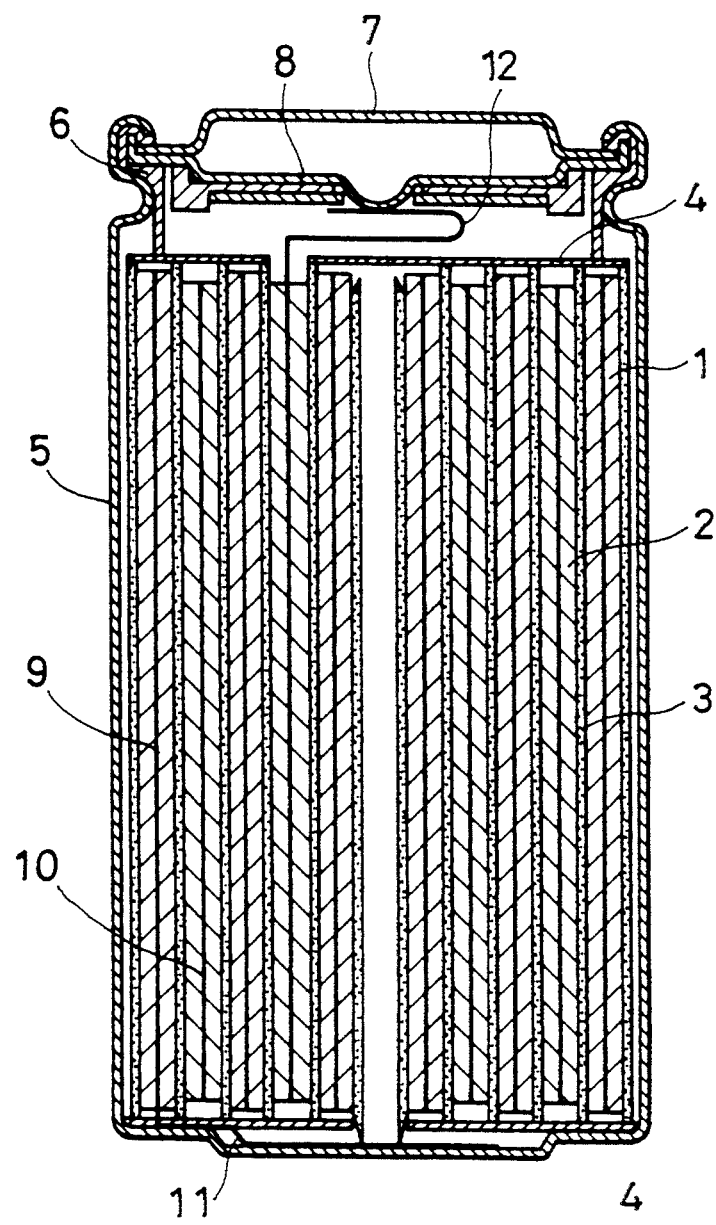
FIG. 1 is a schematic longitudinal cross-sectional view showing an example of the non-aqueous liquid electrolyte secondary cell according to the present invention.

The non-aqueous liquid electrolyte secondary cell according to the present invention is comprised of a negative electrode capable of being doped with and releasing lithium, a positive electrode, and a non-aqueous liquid electrolyte, that is an electrolyte dissolved in the non-aqueous solvent.

According to the present invention, in order that superior cyclic characteristics of the non-aqueous liquid electrolyte secondary cell may be maintained for prolonged time even after repeated charging/discharging cycles at the charging voltage exceeding 4 V, the non-aqueous solvent for the non-aqueous liquid electrolyte containing pyrocarbonates represented by the formula $(ROCO)_2O$, where R denotes alkyl groups selected from among $CH_3$, $C_2H_5$ and $C_3H_7$, is employed. The pyrocarbonates are organic compounds having extremely high stability. If the non-aqueous solvent containing the pyrocarbonate is employed, a non-aqueous liquid electrolyte secondary cell may be produced which is capable of withstanding charging/discharging cycles at a high charging voltage and which is excellent in operational reliability and charging/discharging characteristics under high temperature environment, discharging characteristics under low temperature environment and the discharging characteristics under heavy loads.

Although the pyrocarbonate may be used by itself as the non-aqueous solvent, it may also be mixed with at least one of the non-aqueous solvents hitherto used for improving, for example, the electrical conductivity, such as propylene carbonate, ethylene carbonate, butylene carbonate or y-butyrolactone. When mixing the pyrocarbonate with other non-aqueous solvent(s), the ratio of the pyrocarbonate in the non-aqueous solvent may preferably be not less than 25 vol%. The content in the non-aqueous solvent of the pyrocarbonate in such quantity is sufficient to produce the above-mentioned favorable effect of the pyrocarbonate.

The electrolytes dissolved in the non-aqueous solvents, such as $LiAsF_6$, $LiPF_6$, $LiPF_6$, $LiBF_4$ or $LiCF_3CO_2$, may be employed.

The non-aqueous liquid electrolyte secondary cell according to the present invention comprises, in addition to the above-mentioned non-aqueous liquid electrolytes, a negative electrode composed of a carbon material capable of being doped with and releasing lithium, and a positive electrode.

Any of the carbon materials employed as the active material of the negative electrode of this type of the non-aqueous liquid electrolyte secondary cell, such as pyrocarbons, cokes, such as pitch cokes, needle cokes, petroleum cokes or the like, graphite, vitreous carbons, sintered products of organic high molecular compounds, such as sintered products of phenol resins or furan resins, sintered at a suitable temperature, carbon fibers and activated charcoal, may be employed as the carbon material constituting the negative electrode.

The active materials of the positive electrodes may be enumerated by lithium transition metal composite oxides, such as $LiM_xN_{1-x}O_2$, where M and N each denote one of Co, Ni, Mr, Cr, Fe and V. Of these, lithium cobalt composite oxides, lithium nickel composite oxides or lithium manganese composite oxides are most desirable.

EXAMPLES

The present invention will be further explained with reference to Examples and Comparative Examples based upon the results of experiments.

Example 1

FIG. 1 shows the construction of the non-aqueous liquid electrolyte secondary cell prepared in accordance with the present Example 1. The non-aqueous liquid electrolyte secondary cell having such structure was prepared in the following manner.

First, for preparing the negative electrode 1, 10 to 20% of the oxygen-containing functional groups were introduced into the petroleum pitch as a starting material by so-called oxygen cross-linking, and the resulting mass was heat-treated at 1000° C. in an inert gas stream to produce a carbon material having properties close to those of the vitreous carbon. The X-ray diffractometry of the carbon material thus produced revealed that the spacing of the (002) plane was 3.76 A. A mixture for the negative electrode was prepared by mixing 90 wt% of the resulting carbon material as the active material of the negative electrode and 10 wt% of polyvinylidene fluoride (PVDF) as the binder. The mixture for the negative electrode was dispersed in N-methyl- 2-pyrrolidone as a solvent to form a slurry of the mixture for the negative electrode.

The slurry mixture for the negative electrode was uniformly coated on both sides of a strip-shaped copper foil, 10 μm in thickness, which is to be a current collector for the negative electrode 9. After drying, the slurry mixture was compression-molded by a roll press to produce a strip-shaped negative electrode 1.

Then, for producing a positive electrode 2, 0.5 mol of lithium carbonate and 1 mol of cobalt carbonate were mixed and sintered in air at 900° C. for five hours to yield $LiCoO_2$. A mixture for the positive electrode was prepared by mixing 91.0 wt% of $LiCoO_2$ as the active material of the positive electrode and 6 wt% Graphite as the Conductive material and 3 wt% of polyvinylidene fluoride as the binder to prepare a mixture for the positive electrode. The mixture for the positive electrode thus prepared was dispersed in N-methyl-2-pyrrolidone as a solvent to form a slurry mixture for the positive electrode.

The slurry mixture for the positive electrode was uniformly coated on both sides of a strip-shaped copper foil, 20 μm in thickness, which is to be a current collector for the positive electrode 10. After drying, the slurry mixture was compression-molded by a roll press to produce a strip-shaped negative electrode 1.

The strip-shaped negative electrode 1 and the strip-shaped positive electrode 2 were stacked with a microporous polypropylene film 25 μm in thickness, as a separator 3, in the sequence of the negative electrode 1, separator 3, positive electrode 2 and the separator 3, and the resulting stacked films were spirally wound a number of times to produce a spiral-shaped electrode device shown in FIG. 1.

The resulting spiral-shaped electrode device was housed within a nickel-plated iron vessel (cell can) 5 and an insulating plate 4 was placed on each of the upper and lower sides of the spiral-shaped electrode device. A positive terminal lead 12 of aluminum was led out from the positive electrode collector 10 and welded to a cell lid 7, and a negative terminal lead 11 of nickel was led out from the negative electrode collector 9 and welded to the cell can 5.

A liquid electrolyte, obtained by dissolving $LiPF_6$ in a non-aqueous solvent mixture at a concentration of 1 mol/liter, was injected into the cell can containing the spiral-shaped electrode device. As the non-aqueous solvent mixture, a mixture of 50 vol% of propylene carbonate (PC) and 50 vol% of dimethyl pyrocarbonate (DMPyC) was used. The cell lid 7 was secured by caulking the cell can 5 via an insulating sealing gasket 6 coated with asphalt to produce a cylindrical-shaped non-aqueous liquid electrolyte cell (cell of the example 1) having a diameter of 20 mm and a height of 50 mm.

Example 2

A cylindrical-shaped non-aqueous liquid electrolyte cell (cell of the example 2) was produced in the same way as in Example 1 except using a non-aqueous solvent mixture of 70 vol% of PC and 30 vol% of DMPyC.

Example 3

A cylindrical-shaped non-aqueous liquid electrolyte cell (cell of the example 3) was produced in the same way as in Example 1 except using a non-aqueous solvent mixture of 30 vol% of PC and 70 vol% of DMPyC.

Example 4

A cylindrical-shaped non-aqueous liquid electrolyte cell (cell of the example 4) was produced in the same way as in Example 1 except using a non-aqueous solvent mixture of 50 vol% of PC and 50 vol% of diethyl pyrocarbonate (DEPyC) as a non-aqueous solvent mixture for the liquid electrolyte.

Comparative Example 1

A cylindrical-shaped non-aqueous liquid electrolyte cell (cell of the comparative example 1) was produced in the same way as in Example 1 except using a non-aqueous solvent mixture of 50 vol% of PC and 50 vol% of dimethoxyethane as a non-aqueous solvent mixture for the liquid electrolyte.

Comparative Example 2

A cylindrical-shaped non-aqueous liquid electrolyte cell (cell of the comparative example 2) was produced in the same way as in Example 1 except using a non-aqueous solvent mixture of 50 vol% of PC and 50 vol% of diethyl carbonate as a non-aqueous solvent mixture for the liquid electrolyte.

The cyclic performance of the non-aqueous liquid electrolyte secondary cells, produced as described above, after charging/discharging cycles under the charging voltage exceeding 4 V, the discharging performance of the cells at lower temperatures and that under the high temperature environment, were checked in the following manner.

Figure 2:
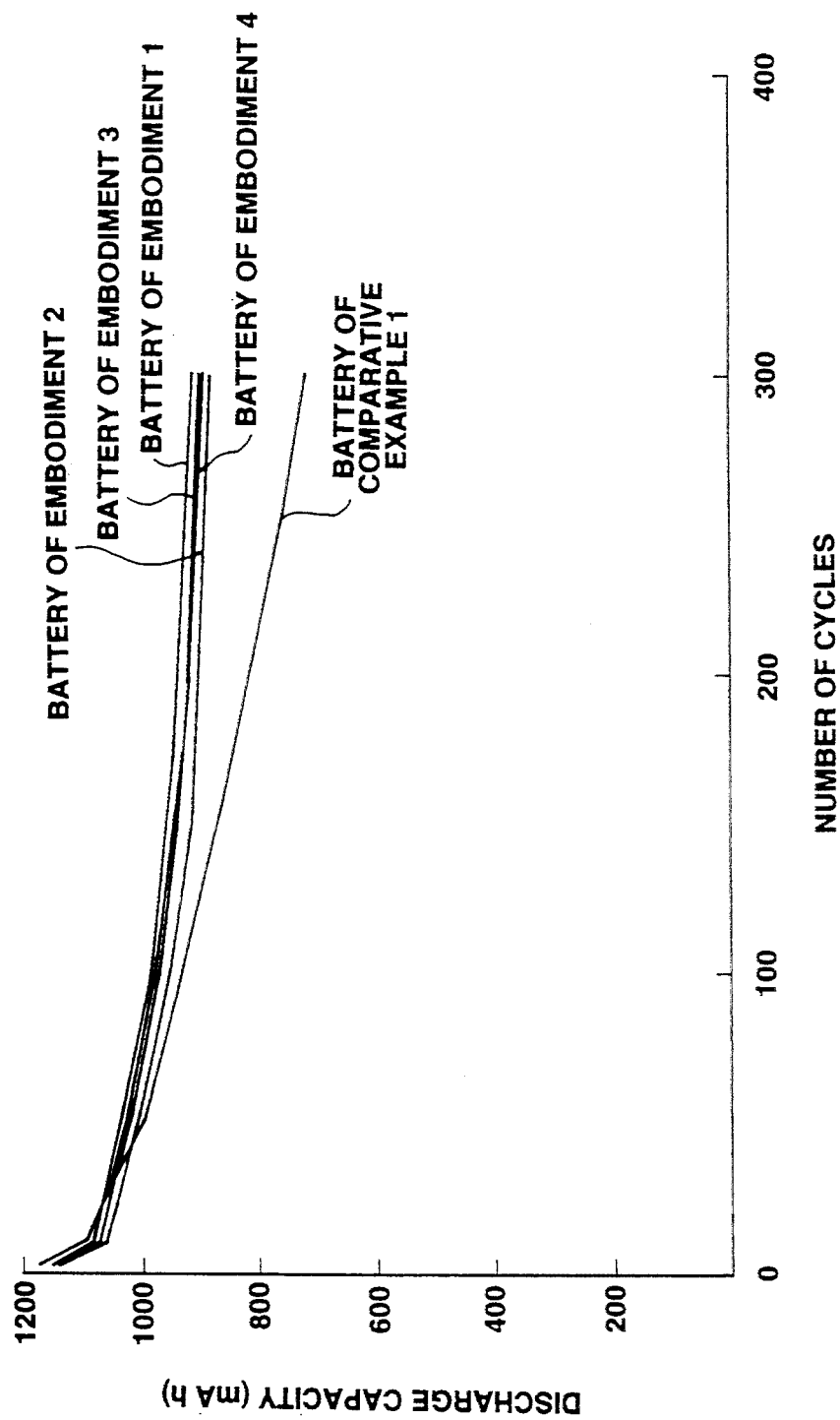
FIG. 2 is a graph showing charging/discharging cyclic characteristics of the non-aqueous liquid electrolyte secondary cell at room temperature.

First, in order to check for the cyclic performance at the charging voltage exceeding 4 V, charging/discharging cycles of charging for 2.5 hours at room temperature under conditions of the charging current of 1 A and an upper voltage of 4.2 V followed by discharging under conditions of the discharging of 0.7 A and the lower voltage of 2.6 V were repeatedly performed on the non-aqueous liquid electrolyte secondary cells, and the discharging capacity of each cell was measured for each cycle. FIG. 2 shows the relation between the number of cycles and the discharging capacity, and Table 1 shows the discharging capacity at the 300th cycle and the volumetric retention ratio (discharging capacity at the 300th cycle/discharging capacity at the 10th cycle).

TABLE 1

|  | discharge capacity at 10th cycle (mAh) | discharge capacity at 300th cycle (mAh) | volume retention ratio (%) |
| --- | --- | --- | --- |
| cell of Ex. 1 | 1080 | 910 | 84.3 |
| cell of Ex. 2 | 1060 | 880 | 83.0 |
| cell of Ex. 3 | 1070 | 895 | 83.6 |
| cell of Ex. 4 | 1080 | 890 | 82.4 |
| cell of Comp. Ex. 1 | 1090 | 720 | 66.5 |

It is seen from FIG. 2 that the cells of the examples 1 to 4 employing the non-aqueous solution mixture containing the pyrocarbonate as the non-aqueous solvent exhibit the cyclic performance which is better than that of the cell of the Comparative Example 1 employing the non-aqueous solvent mixture containing dimethoxy ethane instead of pyrocarbonate. Also, as shown in Table 1, the volume retention ratio of the cell of the Comparative Example 1 is 66.5%, while that of the cells of the Examples 1 to 4 is of larger values exceeding 82%.

It is seen from above that the pyrocarbonate is superior in voltage stability to dimethoxyethane and is capable of withstanding the charging voltage exceeding 4 V so that pyrocarbonate may be preferred for use in the non-aqueous solvent for the non-aqueous liquid electrolyte secondary cell.

Figure 3:
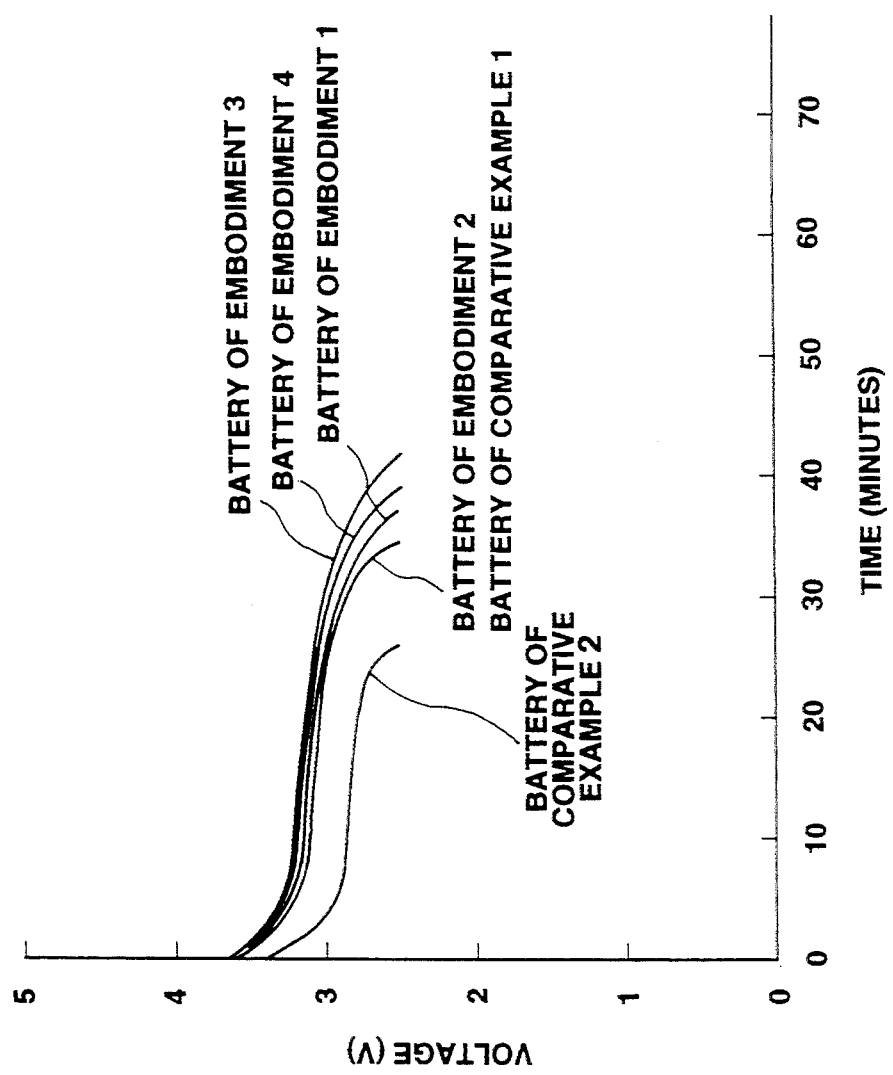
FIG. 3 is a graph showing discharging characteristics of the non-aqueous liquid electrolyte secondary cell under a low-temperature environment.

The cells were then charged for 2.5 hours under the charging conditions of the charging current of 1 A and an upper voltage of 4.2 V. The cells thus charged were allowed to stand at $-10°$ C. for two hours and discharged under the discharging conditions of the discharging current of 700 mA and the terminal voltage of 2.5 V, and changes in the discharging voltage with lapse of time and the discharging capacity at the end of the discharging were checked. FIG. 3 shows the relation between the discharging time and the discharging voltage and Table 2 shows the discharging capacity and the ratio of the discharging time to the discharging ratio as measured at the environment of 23° C. (discharging capacity at $-10°$ C./discharging capacity at 23° C.).

TABLE 2

|  | discharge capacity under $-10°$ C. environment (mAh) | discharge capacity under $-10°$ C. environment/ discharge capacity under 23° C. environment (%) |
| --- | --- | --- |
| cell of Ex. 1 | 430 | 39.8 |
| cell of Ex. 2 | 400 | 37.7 |
| cell of Ex. 3 | 480 | 44.9 |
| cell of Ex. 4 | 450 | 41.7 |
| cell of Comp. Ex. 1 | 400 | 36.7 |
| cell of Comp. Ex. 2 | 300 | 28.8 |

It is seen from FIG. 3 and Table 2 that the discharging performance and the discharging capacity under the low-temperature environment of the cells of the Examples 1 to 4 employing the non-aqueous solvent mixture containing the pyrocarbonate as the non-aqueous solvent are superior to those of the cell of the Comparative Example 2 employing the non-aqueous solvent mixture containing the diethylcarbonate as the non-aqueous solvent and are also superior to those of the cell of the Comparative Example 1 which employs the non-aqueous solvent mixture containing dimethoxyethane as the non-aqueous solvent and which is said to exhibit acceptable low-temperature characteristics.

Then, in order to check for cyclic performance of the non-aqueous liquid electrolyte secondary cells under high-temperature environments, the charging/discharging cycles were repeatedly performed on the non-aqueous liquid electrolyte secondary cells at 45° C. and otherwise the same conditions as above and measurements were made of the discharging capacity for each cycle. FIG. 4 shows the relation between the number of cycles and the discharging capacity, and Table 3 shows the discharging capacity at the 100th cycle and the volumetric retention ratio (discharging capacity at the 100th cycle/discharging capacity at the 10th cycle).

TABLE 3

|  | discharge capacity at 10th cycle (mAh) | discharge capacity at 100th cycle (mAh) | volume retention ratio (%) |
| --- | --- | --- | --- |
| cell of Ex. 1 | 1100 | 880 | 88.0 |
| cell of Ex. 2 | 1080 | 870 | 80.6 |
| cell of Ex. 3 | 1110 | 870 | 78.4 |
| cell of Ex. 4 | 1100 | 895 | 81.4 |
| cell of Comp. Ex. 1 | 1120 | 620 | 55.4 |
| cell of Comp. Ex. 2 | 1040 | 825 | 79.3 |

It is seen from Table 4 that the cells of the Examples 1 to 4 employing the non-aqueous solvent mixture containing the pyrocarbonate as the non-aqueous solvent exhibit highly satisfactory cyclic performance even under high temperature conditions. As shown in Table 3, the volume retention ratio of the cells of the Examples 1 to 4 is exceedingly higher than that of the cell of the Comparative Example 1 containing dimethoxyethane in place of pyrocarbonate and compares favorably with that of the cell of the Comparative Example 1 which contains diethyl carbonate and which is known to exhibit acceptable high temperature characteristics.

It is seen from the above results that, by employing the non-aqueous solvent containing the pyrocarbonate, the non-aqueous liquid electrolyte secondary cell may be produced which is improved in operating reliability and in the cyclic performance at the charging voltage exceeding 4 V and which exhibits sufficient cell characteristics even under low-temperature and high-temperature environments.

What is claimed is:

1. A non-aqueous liquid electrolyte secondary cell comprising:
   a negative electrode formed of a carbon material capable of being doped with and releasing lithium,
   a positive electrode, and
   a non-aqueous liquid electrolyte solution including an electrolyte dissolved in a non-aqueous solvent, said non-aqueous solvent including
   pyrocarbonate having the formula $(ROCO)_2O$, wherein R is an alkyl group selected from the group consisting of $CH_3$, $C_2H_5$ and $C_3H_7$.

2. The non-aqueous liquid electrolyte secondary cell as claimed in claim 1 wherein the proportion of the pyrocarbonate is not less than 25 vol%.

3. A non-aqueous lithium secondary battery comprising an electrolyte solvent selected from the group consisting of dimethyl pyrocarbonate, diethyl pyrocarbonate and dipropyl pyrocarbonate.

* * * * *